US012710362B2

(12) United States Patent
Hoffmann et al.

(10) Patent No.: US 12,710,362 B2
(45) Date of Patent: Aug. 18, 2026

(54) QUANTIFICATION METHOD

(71) Applicant: Nicoventures Trading Limited, London (GB)

(72) Inventors: Anais Hoffmann, London (GB); Jana Jeffery, London (GB)

(73) Assignee: NICOVENTURES TRADING LIMITED, London (GB)

( * ) Notice: Subject to any disclaimer, the term of this patent is extended or adjusted under 35 U.S.C. 154(b) by 205 days.

(21) Appl. No.: 18/698,325

(22) PCT Filed: Sep. 30, 2022

(86) PCT No.: PCT/GB2022/052483
§ 371 (c)(1),
(2) Date: Apr. 3, 2024

(87) PCT Pub. No.: WO2023/057739
PCT Pub. Date: Apr. 13, 2023

(65) Prior Publication Data

US 2024/0402079 A1 Dec. 5, 2024

(30) Foreign Application Priority Data

Oct. 6, 2021 (GB) ..................................... 2114308

(51) Int. Cl.
*G01N 21/359* (2014.01)
*G01N 21/3563* (2014.01)
*G01N 21/3577* (2014.01)

(52) U.S. Cl.
CPC ....... *G01N 21/359* (2013.01); *G01N 21/3563* (2013.01); *G01N 21/3577* (2013.01);
(Continued)

(58) Field of Classification Search
CPC ............. G01N 21/359; G01N 21/3563; G01N 21/3577; G01N 2201/127; G01N 2201/1296; G01N 33/02; G01N 2201/129
See application file for complete search history.

(56) References Cited

U.S. PATENT DOCUMENTS 5,243,546 A * 9/1993 Maggard ............. G01N 21/274 702/90
10,477,896 B2 11/2019 Sur et al.
(Continued)

FOREIGN PATENT DOCUMENTS

CA 2936184 C * 9/2018 ......... G01N 21/3577
CN 102778442 A 11/2012
(Continued)

OTHER PUBLICATIONS

International Search Report and Written Opinion issued in PCT Application No. PCT/GB2022/052483, mailed Nov. 25, 2022, 11 pages.
(Continued)

*Primary Examiner* — Kiho Kim
(74) *Attorney, Agent, or Firm* — WOMBLE BOND DICKINSON (US) LLP; Mark R. DeLuca

(57) ABSTRACT

A method of quantifying an amount of a substance in a sample of material for a delivery system, the method comprising: obtaining first near infra-red spectroscopy data for the sample of material in a first wavelength range; obtaining second near infra-red spectroscopy data for the sample of material in a second wavelength range, wherein the second wavelength range is separated from the first wavelength range; and using the first and second near infra-red spectroscopy data to estimate an amount of the substance in the sample of material.

21 Claims, 5 Drawing Sheets

S1: Obtain first near infra-red spectroscopy data for a sample of material for a delivery system in a first wavelength range S2: Obtain second near infra-red spectroscopy data for the sample of material in a second wavelength range S3: Use the first and second near infra-red spectroscopy data to estimate an amount of the substance in the sample of material

(52) U.S. Cl.
CPC .................. *G01N 2201/127* (2013.01); *G01N 2201/1296* (2013.01)

(56) References Cited

U.S. PATENT DOCUMENTS

| | | | | |
|---|---|---|---|---|
| 2002/0197725 | A1* | 12/2002 | Eaton | G01N 21/75 436/171 |
| 2003/0213911 | A1 | 11/2003 | Fulmer et al. | |
| 2010/0249664 | A1* | 9/2010 | Burns | G01N 21/552 600/587 |
| 2011/0054864 | A1* | 3/2011 | Lundstedt | G01N 35/00871 703/2 |
| 2012/0078473 | A1* | 3/2012 | Ridder | A61B 5/1455 701/45 |
| 2016/0047741 | A1* | 2/2016 | Lober | G05D 11/138 137/2 |
| 2017/0020195 | A1 | 1/2017 | Cameron | |
| 2019/0033210 | A1* | 1/2019 | Yarden | B07C 5/342 |

FOREIGN PATENT DOCUMENTS

| | | | |
|---|---|---|---|
| CN | 108693139 | A | 10/2018 |
| CN | 110967313 | A | 4/2020 |
| EP | 3734254 | A1 | 11/2020 |
| JP | H08-101122 | A | 4/1996 |
| WO | 93/06774 | A1 | 4/1993 |
| WO | 2005/099404 | A2 | 10/2005 |
| WO | 2009/041252 | A1 | 4/2009 |
| WO | 2015/019265 | A1 | 2/2015 |
| WO | 2020/118355 | A1 | 6/2020 |

OTHER PUBLICATIONS

Metrohm USA Inc., "Nicotine and Glycerin Quanitification in E-Liquids Using Visible NIR Spectroscopy," Sep. 12, 2019, News Medical Life Sciences, 8 pages.

* cited by examiner

QUANTIFICATION METHOD

CROSS-REFERENCE TO RELATED APPLICATIONS

This application is a national stage application filed under 35 U.S.C. 371 of International Application No. PCT/GB2022/052483, filed Sep. 30, 2022, which claims priority to, and the benefit of, Patent Application No. GB 2114308.6, filed Oct. 6, 2021, each of which is incorporated herein in its entirety by reference.

FIELD

The present disclosure relates to the quantification of substances in materials for use in delivery systems via infra-red spectroscopy.

BACKGROUND

Delivery systems are systems which deliver one or more materials to a user, for example, by inhalation, ingestion, chewing, or transfer of material across the skin of a user. Aerosol provision systems, for example e-cigarettes, are a class of delivery system which generally contain an aerosol generating material such as a reservoir of a source liquid, typically comprising one or more aerosol formers, one or more flavouring agents and one or more active substances, from which an aerosol is generated for inhalation by a user, e.g. by heating or mechanical vaporisation. The active substance may comprise, for example, nicotine or a cannabinoid substance. In other aerosol provision systems, an aerosol generating material comprising a gel or solid material is heated to generate an inhalable aerosol. In aerosol-free delivery systems, a material comprising one or more active substances and/or one or more flavours may be delivered in the form of a pouched oral product such as a smokeless tobacco product, or an oral product containing a tobacco-free substrate. The aforementioned types of delivery system may optionally be referred to as tobacco industry delivery systems.

It is of interest to quantify the constituents of materials for delivery to a user in a delivery system (e.g. a tobacco-industry delivery system). The term 'tobacco industry' is used to refer not only to activities involving tobacco (e.g. combustible cigarettes, and non-combustible products such as snuff and chewing tobacco), but also to aerosol delivery devices (e.g. development and manufacture of aerosol generating liquids or 'e-liquids' for such devices), patches for transdermal active delivery, and oral products such as gums and tobacco-free substrates. This quantification may comprise determining a quantity of one or more constituent materials or substances comprised in a material to be delivered to a user via a delivery system, such as, for instance, an amount of an active substance in terms of a percentage by weight (w/w %) of the active substance in the material. Such quantification may be used for purposes of quality control, for instance, to analyse the composition of raw materials prior to their use in manufacturing a material for use in a delivery system. Such quantification may also be used to check the composition of a manufactured material for use in a delivery system is within predefined tolerances (for instance, in terms of a quantity of an active substance in the material).

There are a number of known spectroscopic methods for quantifying constituent components of materials for use in delivery systems (e.g. tobacco industry delivery systems), such as gas and liquid chromatography, Fourier transform infra-red spectroscopy (FTIR), and near infra-red (NIR) spectroscopy. In infra-red spectroscopy approaches, infra-red signals are transmitted through or reflected/scattered from a sample, and the distribution of wavelengths in the resulting signal are measured. The characteristics of a signal collected after interaction with the sample can be expressed as a spectrum, where the intensity of infra-red absorbance is plotted against the wavenumber or wavelength (for example, wavenumber expressed in units of $cm^{-1}$). An infra-red absorption spectrum for a sample exhibits characteristic absorbance peaks whose magnitude and position are related to the presence and concentration(s) of different chemical compounds in the sample.

Analysis of one or more infra-red spectra for a sample can be carried out to estimate the concentration of a given constituent of the sample. This can be performed using a calibrated model, which takes an infra-red spectrum of a sample as an input, and estimates the concentration of one or more constituents of the sample as an output. Such a model is generally termed a 'chemometric' model. Such a model will generally be fitted using a set of calibration spectra associated with a range of calibration samples containing known quantities of one or more substances of interest, as determined, for example, using a complementary analytical technique. Known statistical techniques such as partial least squares (PLS) regression can be applied to a set of calibration spectra to obtain a model which can be used to estimate the quantity of one or more substances of interest in a sample of analyte, based on its infra-red spectrum.

The inventors have recognised that known approaches for determining the amount of a substance of interest in a material for use in a delivery system using infra-red spectroscopy and chemometric modelling may not provide a suitable level of accuracy. Various approaches are described herein which seek to help address or mitigate at least some of the issues discussed above. In particular, approaches are described which improve the resolution of infra-red spectra obtained from a sample of material, in order to allow the specificity of detection of a target substance to be improved. This may be considered of particular benefit when interferent compounds (e.g. flavourings and acids) are present in the material to be analysed.

SUMMARY

According to a first aspect of the present disclosure, there is provided a method of quantifying an amount of a substance in a sample of material for a delivery system, the method comprising: obtaining first near infra-red spectroscopy data for the sample of material in a first wavelength range; obtaining second near infra-red spectroscopy data for the sample of material in a second wavelength range, wherein the second wavelength range is separated from the first wavelength range; and using the first and second near infra-red spectroscopy data to estimate an amount of the substance in the sample of material.

In an exemplary embodiment, the material comprises a liquid for a delivery system.

In an exemplary embodiment, the material comprises a solid for a delivery system.

In an exemplary embodiment, the material comprises a gel for a delivery system.

In an exemplary embodiment, the material comprises a material for an aerosol delivery system.

In an exemplary embodiment, the material comprises a material for use in an oral delivery system selected from a list comprising snus, snuff, gums, gels, spray, and patches.

In an exemplary embodiment, the substance comprises an active substance.

In an exemplary embodiment, the substance comprises nicotine.

In an exemplary embodiment, the substance comprises a cannabinoid.

In an exemplary embodiment, the substance comprises vegetable glycerine.

In an exemplary embodiment, the substance comprises propylene glycol.

In an exemplary embodiment, the substance comprises water.

In an exemplary embodiment, the amount of the substance in the sample of liquid is estimated using a chemometric model.

In an exemplary embodiment, the chemometric model is derived using a partial least squares approach.

In an exemplary embodiment, the chemometric model is derived using a neural network approach.

In an exemplary embodiment, the chemometric model is derived based on spectroscopy data for a plurality of calibration samples of liquid, wherein the plurality of samples of liquid have different known amounts of the substance.

In an exemplary embodiment, the amount of the substance in the sample of liquid is quantified by providing, as an input to the chemometric model, the first near infra-red spectroscopy data for the sample of liquid in the first wavelength range, and the second near infra-red spectroscopy data for the sample of liquid in the second wavelength range, and wherein the output of the chemometric model comprises an estimate of an amount of the substance in the sample of liquid.

According to a second aspect of the present disclosure, there is provided a method of obtaining calibration data to use for quantifying an amount of a substance in a sample of material for a delivery system, the method comprising: obtaining first near infra-red spectroscopy data for a calibration sample of material containing a first known amount of the substance in a first wavelength range; obtaining second near infra-red spectroscopy data for the calibration sample of material in a second wavelength range; and combining the first near infra-red spectroscopy data and the second near infra-red spectroscopy data to provide the calibration data.

In an exemplary embodiment, the method further comprises: obtaining further first near infra-red spectroscopy data for a further calibration sample of material containing a further known amount of the substance in a first wavelength range; obtaining further second near infra-red spectroscopy data for the further calibration sample of material in a second wavelength range; and combining the further first near infra-red spectroscopy data and the further second near infra-red spectroscopy data with the calibration data.

In an exemplary embodiment, the first wavelength range covers the range from 5700 to 6100 $cm^{-1}$.

In an exemplary embodiment, the second wavelength range covers the range from 8200-9200 $cm^{-1}$.

According to a third aspect of the present disclosure, there is provided a computer program product for quantifying an amount of substance in a sample of material for a delivery system, the computer program product comprising instructions which, when the program is executed by a computer, cause the computer to carry out the steps of: obtaining first near infra-red spectroscopy data for the sample of material in a first wavelength range; obtaining second near infra-red spectroscopy data for the sample of material in a second wavelength range, wherein the second wavelength range is separated from the first wavelength range; and using the first and second near infra-red spectroscopy data to estimate an amount of the substance in the sample of material.

According to a fourth aspect of the present disclosure, there is provided a computer program product for obtaining calibration data to use for quantifying an amount of a substance in a sample of material for a delivery system, the computer program product comprising instructions which, when the program is executed by a computer, cause the computer to carry out the steps of: obtaining first near infra-red spectroscopy data for the sample of material in a first wavelength range; obtaining second near infra-red spectroscopy data for the sample of material in a second wavelength range, wherein the second wavelength range is separated from the first wavelength range; and using the first and second near infra-red spectroscopy data to estimate an amount of the substance in the sample of material.

In an exemplary embodiment, the first wavelength range covers the range from 5700 to 6100 $cm^{-1}$.

In an exemplary embodiment, the second wavelength range covers the range from 8200-9200 $cm^{-1}$.

Further features and advantages of the disclosure will become apparent from the following description of preferred embodiments of the disclosure, given by way of example only, which is made with reference to the accompanying drawings.

BRIEF DESCRIPTION OF THE DRAWINGS

Embodiments of the disclosure will now be described, by way of example only, with reference to the accompanying drawings, in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

Embodiments of the disclosure relate to methods, computer program products and apparatuses for quantifying an amount of a substance in a sample of material for a delivery system (e.g. a tobacco-industry delivery system), based on near infra-red (NIR) spectroscopy data for the sample of material, wherein the amount of the substance (e.g. a substance of interest) in the sample of material is estimated based on the NIR spectroscopy data.

Figure 1:
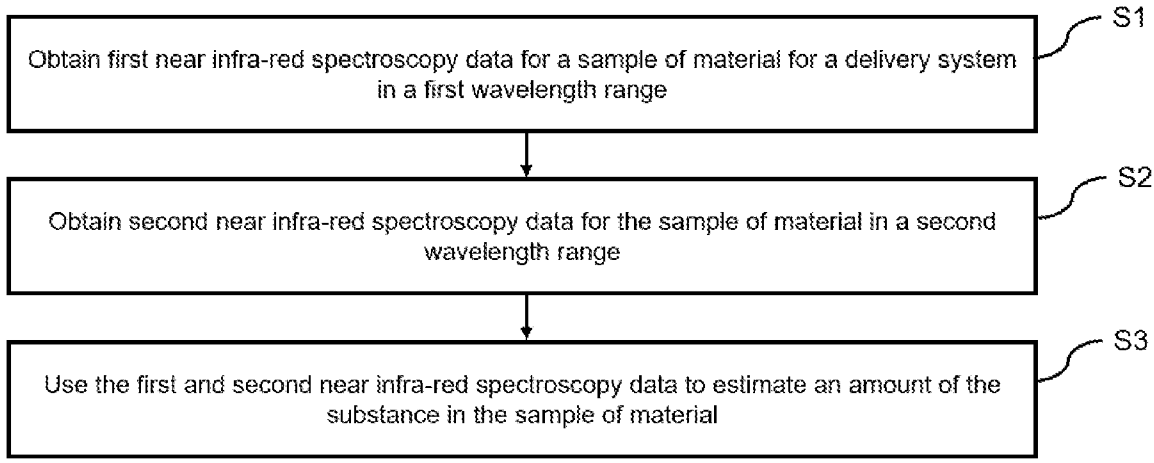
FIG. 1 is a schematic diagram of an approach for estimating an amount of a substance in a sample of material according to the present disclosure.

FIG. 1 shows schematically an approach for quantifying an amount of a substance in a sample of material for a delivery system (e.g. a tobacco-industry delivery system), according to which, in step S1, first near infra-red spectroscopy data is obtained for a sample of material in a first wavelength range; in step S2, second near infra-red spectroscopy data is obtained for the sample of material in a second wavelength range; and in step S3, the first and second near infra-red spectroscopy data are used to estimate an amount of the substance in the sample of material.

The approaches set out herein for quantification of an amount of a substance (which may be herein be referred to as a substance of interest) in a material may be applied in respect of aerosol generating materials for use in delivery systems, such as combustible aerosol provision systems and non-combustible aerosol provision systems, and in respect of materials for use in aerosol-free delivery systems. Such a delivery system may be optionally referred to herein as a tobacco industry delivery system, or a consumer delivery system (e.g. a handheld, battery-operated consumer delivery system), which may optionally be a non-pharmaceutical delivery system (e.g. the delivery system is not a nebuliser or similar medical device used to delivery pharmaceutical actives in a hospital context). The approaches set out herein may be applied in respect of substances comprised in such materials, such as active substances, flavours, aerosol-former materials, functional materials, and aerosol-modifying agents. Accordingly, the approaches set out herein may be applied to aerosol generating materials for cigarettes (e.g. to tobacco), for heat-not-burn products (such as Tobacco Heating Products (THPs) and Carbon Tip Heating Products (CTHPs)) in which a solid material is heated to generate aerosol without combusting the material, vapour products (commonly known as "electronic cigarettes" or "e-cigarettes") in which liquid material is heated to generate aerosol, and hybrid products that are similar to vapour products except that the aerosol generated from the liquid material passes through a second material (such as tobacco) to pick up additional constituents before reaching the user. The approaches set out herein may also be applied to materials and substances for oral products such as snus, snuff, gums, gels, sprays, and other delivery systems such as patches, and to these consumables themselves.

As used herein, the term aerosol generating material typically includes materials that provide volatilised components upon heating, typically in the form of vapour or an aerosol. An aerosol generating material may be a non-tobacco-containing material or a tobacco-containing material. Aerosol generating material may, for example, include one or more of tobacco per se, tobacco derivatives, expanded tobacco, reconstituted tobacco, tobacco extract, homogenised tobacco or tobacco substitutes. The aerosol generating material can be in the form of ground tobacco, cut rag tobacco, extruded tobacco, reconstituted tobacco, reconstituted aerosol generating material, liquid, gel, amorphous solid, gelled sheet, powder, or agglomerates, or the like. Aerosol generating material also may include other, non-tobacco, products, which, depending on the product, may or may not contain nicotine. Aerosol generating material may comprise one or more humectants or aerosol formers, such as water, glycerol, vegetable glycerine, propylene glycol, triacetin, or diethylene glycol. In embodiments of the disclosure, the substance of interest to be quantified (i.e. for which an amount of substance in a sample of material is to be estimated) comprises an aerosol generating material.

Where the material comprises an aerosol generating material, the aerosol generating material may comprise one or more of water, glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

As noted above, an aerosol generating material may comprise an "amorphous solid", which may alternatively be referred to as a "monolithic solid" (i.e. non-fibrous), or as a "dried gel". The amorphous solid is a solid material that may retain some fluid, such as liquid, within it. In some cases, the aerosol generating material comprises from about 50 wt %, 60 wt % or 70 wt % of amorphous solid, to about 90 wt %, 95 wt % or 100 wt % of amorphous solid. In some cases, the aerosol generating material consists of amorphous solid.

In some embodiments, the approaches for quantification of an amount of a substance in a material may be applied in respect of materials for delivery by an aerosol-free delivery system that delivers at least one substance to a user orally, nasally, transdermally or in another way without forming an aerosol, including but not limited to, lozenges, gums, patches, articles comprising inhalable powders, and oral products such as oral tobacco which includes snus or moist snuff, wherein the at least one substance may or may not comprise nicotine.

As noted above, the material may be an aerosol-generating material or a material that is not intended to be aerosolised. As appropriate, either kind of material may comprise one or more active constituents/substances, one or more flavours, one or more aerosol-former materials, and/or one or more other functional materials.

The material may comprise an active substance, which may be a physiologically active material (i.e. a material intended to achieve or enhance a physiological response). The active substance may for example be selected from nutraceuticals, nootropics, and psychoactives. The active substance may be naturally occurring or synthetically obtained. The active substance may comprise for example nicotine, nicotine salts, caffeine, taurine, theine, vitamins such as B6 or B12 or C, melatonin, cannabinoids (e.g. cannabidiol (CBD), cannabidiolic acid (CBDa), tetrahydrocannabinol (THC), tetrahydrocannabinolic acid (THCa), cannabinol (CBN), cannabinolic acid (CBNa), cannabigerol (CBG), cannabigerolic acid (CBGa), cannabichromene (CBC), cannabichromenic acid (CBCa), and/or cannabidiol hydroxyquinone (CBDHQ or HU-331)), or constituents, derivatives, or combinations thereof.

More generally the active substance may comprise any legally permissible recreational drug. The active substance may comprise one or more constituents, derivatives or extracts of tobacco, cannabis or another botanical. As noted herein, the active substance may comprise one or more constituents, derivatives or extracts of cannabis, such as one or more cannabinoids or terpenes. In embodiments of the disclosure, the substance of interest to be quantified comprises an active substance.

Where the material comprises an active substance, the active substance may comprise or be derived from one or more botanicals or constituents, derivatives or extracts thereof. As used herein, the term "botanical" includes any material derived from plants including, but not limited to, extracts, leaves, bark, fibres, stems, roots, seeds, flowers, fruits, pollen, husk, shells or the like. Alternatively, the material may comprise an active compound naturally existing in a botanical, obtained synthetically. The material may be in the form of liquid, gas, solid, powder, dust, crushed particles, granules, pellets, shreds, strips, sheets, or the like. Example botanicals are tobacco, eucalyptus, star anise, hemp, cocoa, cannabis, fennel, lemongrass, peppermint, spearmint, rooibos, chamomile, flax, ginger, *Ginkgo biloba*, hazel, hibiscus, laurel, licorice (liquorice), matcha, mate, orange skin, papaya, rose, sage, tea such as green tea or black tea, thyme, clove, cinnamon, coffee, aniseed (anise), basil, bay leaves, cardamom, coriander, cumin, nutmeg, oregano, paprika, rosemary, saffron, lavender, lemon peel, mint, juniper, elderflower, vanilla, wintergreen, beefsteak plant, curcuma, turmeric, sandalwood, cilantro, bergamot, orange blossom, myrtle, cassis, valerian, pimento, mace, damien, marjoram, olive, lemon balm, lemon basil, chive, carvi, verbena, tarragon, geranium, mulberry, *ginseng*, theanine, theacrine, maca, ashwagandha, damiana, guarana, chlorophyll, baobab or any combination thereof. The mint may be chosen from the following mint varieties: *Mentha* Arventis, *Mentha* c.v., *Mentha niliaca, Mentha piperita, Mentha piperita citrata* c.v., *Mentha piperita* c.v, *Mentha spicata crispa, Mentha cordifolia, Mentha longifolia, Mentha suaveolens variegata, Mentha pulegium, Mentha spicata* c.v. and *Mentha suaveolens.*

The material may comprise a flavour or flavourant, these terms being used to refer to materials which, where local regulations permit, may be used to create a desired taste, aroma or other somatosensorial sensation in a product for adult consumers. They may include naturally occurring flavour materials, botanicals, extracts of botanicals, synthetically obtained materials, or combinations thereof (e.g., tobacco, cannabis, licorice (liquorice), hydrangea, eugenol, Japanese white bark magnolia leaf, chamomile, fenugreek, clove, maple, matcha, menthol, Japanese mint, aniseed (anise), cinnamon, turmeric, Indian spices, Asian spices, herb, wintergreen, cherry, berry, red berry, cranberry, peach, apple, orange, mango, clementine, lemon, lime, tropical fruit, papaya, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, betel, shisha, pine, honey essence, rose oil, vanilla, lemon oil, orange oil, orange blossom, cherry blossom, cassia, caraway, cognac, jasmine, ylang-ylang, sage, fennel, wasabi, piment, ginger, coriander, coffee, hemp, a mint oil from any species of the genus *Mentha*, eucalyptus, star anise, cocoa, lemongrass, rooibos, flax, *Ginkgo biloba*, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, curcuma, cilantro, myrtle, cassis, valerian, pimento, mace, damien, marjoram, olive, lemon balm, lemon basil, chive, carvi, verbena, tarragon, limonene, thymol, camphene), flavour enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, liquid such as an oil, solid such as a powder, or gas. In embodiments of the disclosure, the substance of interest to be quantified comprises a flavour or flavourant.

The material may comprise a functional material, this may comprise one or more of pH regulators, colouring agents, preservatives, binders, fillers, stabilizers, and/or antioxidants. In embodiments of the disclosure, the substance of interest to be quantified comprises a functional material.

The material may be present on or in a support, to form a substrate. The support may, for example, comprise paper, card, paperboard, cardboard, reconstituted material, a plastics material, a ceramic material, a composite material, glass, a metal, or a metal alloy. In some embodiments, the support comprises a susceptor. In some embodiments, the susceptor is embedded within the material. In some alternative embodiments, the susceptor is on one or either side of the material.

The material may be comprised in a consumable, which is an article comprising or consisting of aerosol-generating material (e.g. in solid, liquid or gel form), part or all of which is intended to be consumed during use by a user. A consumable may comprise one or more other components, such as an aerosol-generating material storage area (e.g. a reservoir for a liquid aerosol generating material), an aerosol-generating material transfer component (e.g. a wick), an aerosol generation area, a housing, a wrapper, a mouthpiece, a filter and/or an aerosol-modifying agent. A consumable may also comprise an aerosol generator, such as a heater, that emits heat to cause the aerosol-generating material to generate aerosol in use. The heater may, for example, comprise combustible material, a material heatable by electrical conduction (e.g. via ohmic heating), or a susceptor.

It is of interest to analyse the composition of materials for use in delivery devices as described herein (e.g. aerosol generating materials for use in aerosol delivery devices), in order to quantify, determine or estimate whether one or more substances of interest are present in the material, and if so, in what quantity. The quantity of a substance of interest may be expressed in any suitable way known to the skilled person, such as, for example, in weight percent (w/w %), volume percent (v/v %), weight by volume (w/v %), mole fraction, or parts per million (ppm). Typically, analysis of material composition involves quantifying the amount of one or more substances of interest in a sample of a material. Herein, a sample of material which is analysed to determine a quantity of one or more substances of interest may be termed an 'analyte' sample. Quantitative analysis of an analyte to estimate the quantity of one or more constituents/substances of interest comprised in the analyte may be carried out for a number of reasons. For example, in some applications the analyte may comprise a sample of raw material taken prior to the use of the raw material in the manufacture of a material for use in a delivery system; or the analyte may comprise a sample of a material for use in a delivery system, the sample being taken during or after manufacture in order to determine whether or not the quantity of one or more constituents/substances of interest comprised in the material are within predefined bounds. These applications may be considered to comprise quality control (QC) applications. In other situations, the sample of analyte may comprise a sample of a material for use in a delivery system which is on manufactured by and/or on sale by a third party, and the quantification of the quantity of one or more constituents/substances of interest comprised in the material may be used for competitor intelligence purposes.

However, the specific reason for quantification of the amount of a substance in a sample of material is not considered significant.

There are a number of known analytical methods for quantifying constituent components of materials for use in delivery systems, including gas and liquid chromatography, Fourier transform infra-red spectroscopy (FTIR), and near infra-red (NIR) spectroscopy. There may broadly be referred to as spectroscopic analysis methods. In infra-red spectroscopy approaches, infra-red signals from an infra-red source are transmitted through or reflected/scattered from a sample, and the distribution of wavelengths in the resulting signal are measured. The wavelength of the infra-red signal may be expressed in terms of microns (μm) and/or in terms of wavenumber ($cm^{-1}$). When an infra-red signal (e.g. a beam of infra-red radiation, which may also be referred to as infra-red light) interacts with the material of a sample at which the signal is directed (e.g. a sample of material for use in a delivery system), certain wavelengths of the infra-red signal are preferentially absorbed by the molecules of the sample. The degree of absorption of different wavelengths of the incident infra-red signal is a function of the constituent materials comprised in the sample, and their relative quantities. An infra-red signal which has interacted with the sample (e.g. by transmission, reflection or scattering from the sample) is collected by an infrared detector which measures one or more characteristics of the sample (e.g. the intensity of the transmitted, reflected or scattered signal over a range of different wavelengths). The signal collected after interaction with the sample can be expressed as a spectrum, where the intensity of infra-red absorbance (or alternatively the transmittance of the infra-red signal) is plotted against the wavenumber or wavelength. An infra-red absorption spectrum for a sample exhibits characteristic absorbance peaks whose magnitude and position are related to the presence and concentration(s) of different chemical compounds in the sample. It will be appreciated for the purposes of the present disclosure that NIR spectra can be obtained for samples of material (e.g. calibration or analyte samples) using any appropriate NIR spectrometer known to the skilled person. Depending on whether the material to be analysed is in liquid, solid or gel form, the NIR spectrometer may be configured in a suitable mode according to approaches known in the art. Where the material is a liquid, a sample of the liquid may be introduced into a transmission cell to obtain NIR spectra for the sample. Where the material is a solid or gel, a sample of the solid or gel may be positioned on a sample stage such that a NIR signal can be directed at a surface of the sample, and a resulting reflected or scattered NIR signal can be collected by a NIR detector. Alternatively, where the material is a solid or gel, a sample of the material may be dissolved in a suitable solvent, and the solvent analysed in, for example, a transmission cell of the NIR spectrometer. In one embodiment, the NIR spectrometer comprises a NIR MB3600 (ABB), though any NIR spectrometer known to the person skilled in the art may in principle be used.

Based on one or more NIR spectra obtained for a sample of material (e.g. an analyte sample comprising a material for use in a delivery system) via NIR spectroscopy as described above, a quantity/amount of a specific substance of interest in the sample may be estimated/determined/established via a quantification approach as set out further herein. Approaches for estimating a quantity of a substance in a sample based on data derived from measurements (such as NIR spectroscopy data) may be referred to as 'chemometric' approaches. Such approaches estimate an amount of substance in a sample of material using a chemometric model, which takes as an input spectroscopy data experimentally derived from the sample of material (e.g. one or more NIR absorption spectra derived from the sample) and provides as an output an estimate of the quantity of one or more substances of interest in the sample. As the skilled person is aware, there are a range of chemometric modelling approaches known in the art, including Principal Component Analysis (PCA), Partial Least Squares (PLS), multivariate curve resolution (MCR) and neural network approaches.

In general, chemometric modelling approaches involve at least two stages, which may be referred to herein as a model establishment stage and a model application stage. In a model establishment stage, spectroscopic data derived from a set of one or more calibration samples containing known quantities of a substance of interest is used to establish (e.g. using statistical approaches) a predictive model for estimating an amount of the substance of interest in an analyte sample based on spectroscopic data derived from the sample. In a model application stage, the established model is applied to spectroscopic data derived from an analyte sample to estimate the quantity of the substance of interest in the analyte sample. Accordingly, where the spectroscopy method is near-infrared (NIR) spectroscopy, a method to estimate a quantity of a substance in a sample of material for use in a delivery system may comprise the steps of: deriving a set of NIR calibration spectra for one or more calibration samples using NIR spectroscopy; deriving ground-truth quantity information for one or more substances of interest for each of the calibration samples (wherein ground-truth quantity information comprises separately-determined information about the amount of one or more substances of interest in each calibration sample which is not derived from the NIR calibration spectra); optionally pre-processing the calibration spectra and/or the ground-truth quantity information; using the calibration spectra and the ground-truth quantity information to establish a model which takes as an input one or more NIR analyte spectra derived for a sample of analyte (the NIR analyte spectra may also be pre-processed) and outputs an estimate of the amount of at least one substance of interest in the analyte; and apply the established model to one or more NIR analyte spectra to estimate an amount of the at least one substance in a sample of material for which the one or more NIR analyte spectra were derived.

Figure 2:
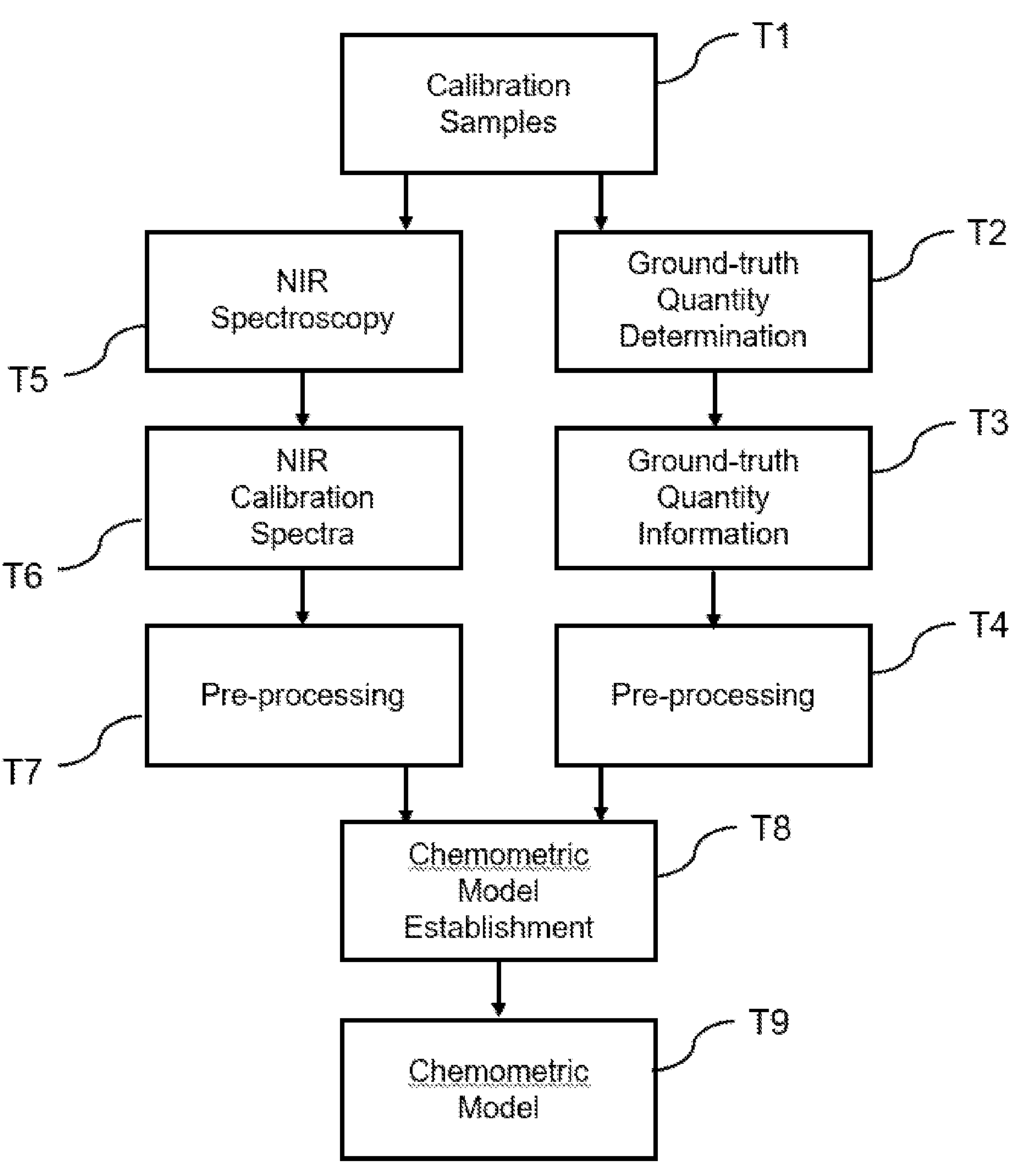
FIG. 2 is a schematic diagram of an approach for establishing a chemometric model according to the present disclosure.

FIG. 2 shows, schematically, an approach for establishing a model which can be used to estimate an amount of the at least one substance in a sample of material for use in a delivery system. In overview, the approach comprises a calibration data collection stage (schematically indicated by steps T1 to T7), wherein NIR calibration spectra and ground-truth quantity information are derived for each of one or more calibration samples, and a chemometric model establishment stage (schematically indicated by steps T8 to T9), wherein a predictive model is derived/trained/established on the basis of the NIR spectra and ground-truth quantity information.

In step S1 of FIG. 2, a set of calibration samples is established. The form/state of the calibration samples will generally be selected based on the form/state of an analyte sample for which the quantity of a substance of interest is to be estimated. Thus, where the approach is to be applied to estimate the quantity of a substance in a sample of liquid material, the calibration samples will generally comprise liquid samples. Where the approach is to be applied to estimate the quantity of a substance in a sample of solid material, the calibration samples will generally comprise solid samples. Where the approach is to be applied to estimate the quantity of a substance in a sample of gel material, the calibration samples will generally comprise gel samples. However, in some embodiments, the form/state of the calibration samples may differ from that of the analyte sample(s). What may be considered significant about the set of calibration samples established in step T1 is that the quantity of one or more substances of interest is known for each sample. For example, where the substance of interest comprises an active substance (e.g. nicotine, caffeine, or a cannabinoid substance), the set of calibration samples is prepared and/or selected such that the quantity of the active substance in each of the calibration samples is known. The concentration/amount of each of one or more substances of interest in each calibration sample is determined in a ground truth quantity determination step T2, which may use a complementary spectroscopic technique known to the skilled person, such as gas or liquid chromatography, FTIR spectroscopy, XRF spectroscopy, or mass spectroscopy. Alternatively or additionally, one or more calibration samples may be prepared by mixing at least one substance of interest and one or more other substances together in known quantities (for example by measuring using analytical instruments the mass or volume of each of the substances to be mixed together). The concentration/amount of each of one or more substances of interest in each calibration sample may be obtained based on a formulation sheet for one or more materials used to prepare the sample. What may be considered significant about the ground-truth quantity information derivation step is that for each calibration sample, information about a quantity of one or more substances of interest is associated with one or more NIR calibration spectra. The combined NIR calibration spectra and associated ground-truth quantity information for a set of calibration samples may be termed ‘calibration data’.

The ground truth quantity determination step T2 results in ground truth quantity information at step T3. It will be appreciated that as used herein, ground truth quantity information is refers generally to information identifying an amount of one or more substances in one or more calibration samples. This information may typically comprise an indication of one or more substances of interest in the calibration sample(s) and an indication of an amount (expressed, for example, in weight percent (w/w %), volume percent (v/v %), weight by volume (w/v %), mole fraction, or parts per million (ppm)) of each substance of interest in each respective calibration sample. This data can be represented in any suitable way known to the skilled person, such as, for example, a matrix or similar data structure. The data may be optionally be pre-processed at step T4, for example, to filter it (e.g. by averaging multiple values), or to adjust the arithmetic precision used to represent the data.

It may be considered advantageous that the range of concentrations of the one or more substances of interest represented in the set of calibration samples prepared/selected at step T1 covers a range of concentrations of the one or more substances of interest which the chemometric model is to be used to quantify. The range of concentration/amount of a substance of interest which is to be estimated using a chemometric model may be referred to herein as a working range for the model. The working range may be used to refer to the range over which a chemometric model is able to estimate the concentration/amount of the substance with greater than a threshold degree of accuracy. If the chemometric model is to be used to estimate quantities of a first substance of interest (for example, nicotine or a cannabinoid) of between 0 and 5 w/w % (i.e. if the working range is to be from 0 to 5 w/w/%), the set of calibration samples may be prepared and/or selected to cover the range of 0 to 5 w/w %. For example, 11 calibration samples may be prepared with concentrations respectively of 0, 0.5, 1, 1.5, 2, 2.5, 3, 3.5, 4, 4.5, and 5 w/w % of the substance of interest to seek to homogeneously cover the intended working range. It will be appreciated that any number of calibration samples may be used, with any range of concentrations of the one or more substances of interest. More generally, the concentrations of a substance of interest in respective calibration samples may be selected such that the set of calibration samples homogenously spans the working range. For example, if the chemometric model is configured to be used to estimate the quantity of a substance X in samples of analyte, and to do so over a working range of C1 to C2 w/w %, then if a set of N calibration samples are used, the nth of the N samples may have a concentration of X of $C1+((C2-C1)/N)*n)$ w/w %. The set of calibration samples may also include one or more samples where the concentration of X is 0 w/w %, and one or more samples in which the concentration of X is significantly higher than the upper end of the target working range (e.g. C2). The set of calibration samples may include one or more samples of pure X (e.g. where the concentration of X is 100 w/w %). The set of calibration samples may include a plurality of samples with the same concentration. In some examples, the concentrations of the substance of interest in the set of calibration samples are clustered with respect to the intended working range, such that when the concentrations of the calibration samples are ordered from the lowest to the highest concentration, the spacing between neighbouring concentrations varies. The spacing may be smaller in selected sub-ranges of the working range, such that comparatively more calibration samples have concentrations of the substance of interest falling within a first sub-range of concentration than for a second, different sub-range of the working range which spans the same difference in concentration.

The number of calibration samples prepared/selected at step T1 can be selected by the skilled person based on a number of factors as described further herein. For example, factors may include the identity of the substance of interest, and whether interference from other constituents of the material is detected in the spectra (e.g. resulting from flavourings, acids, aerosol formers or other compounds comprised in the material). Additionally or alternatively, if following the calibration steps set out herein, the calibrated model is found to under-estimate the quantity of the substance of interest, the number of calibration samples may be increased, and/or the quantity of other constituents in the calibration samples may be varied.

In a NIR calibration spectra collection step T5, one or more NIR calibration spectra are collected for each of the calibration samples using an NIR spectrometer, according to one or more approaches for the collection of NIR spectra described further herein. Any approach and apparatus known to the skilled person for acquiring NIR spectra from samples of material can in principle be used to obtain NIR spectroscopy data for a sample of material for use in a delivery system, according to the present disclosure. As the skilled person is aware, there are a range of commercially available near-infrared spectrometers which can be used to acquire NIR absorption spectra for samples of material including liquids, gels and solids. For example, the analyser may be a laboratory instrument or a field-portable device, which may be handheld. In some embodiments, the analyser is an NIR MB3600 (ABB).

Figure 3:
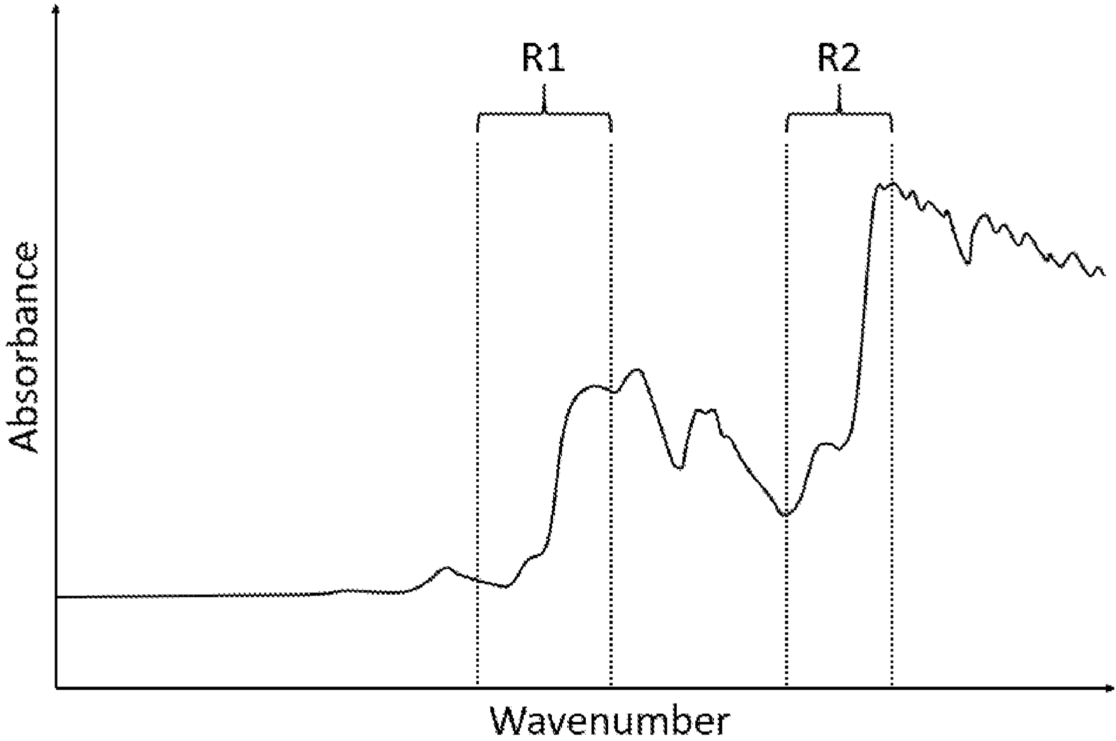
FIG. 3 is a schematic diagram of a near-infrared spectrum for a sample according the present disclosure.
Figure 4:
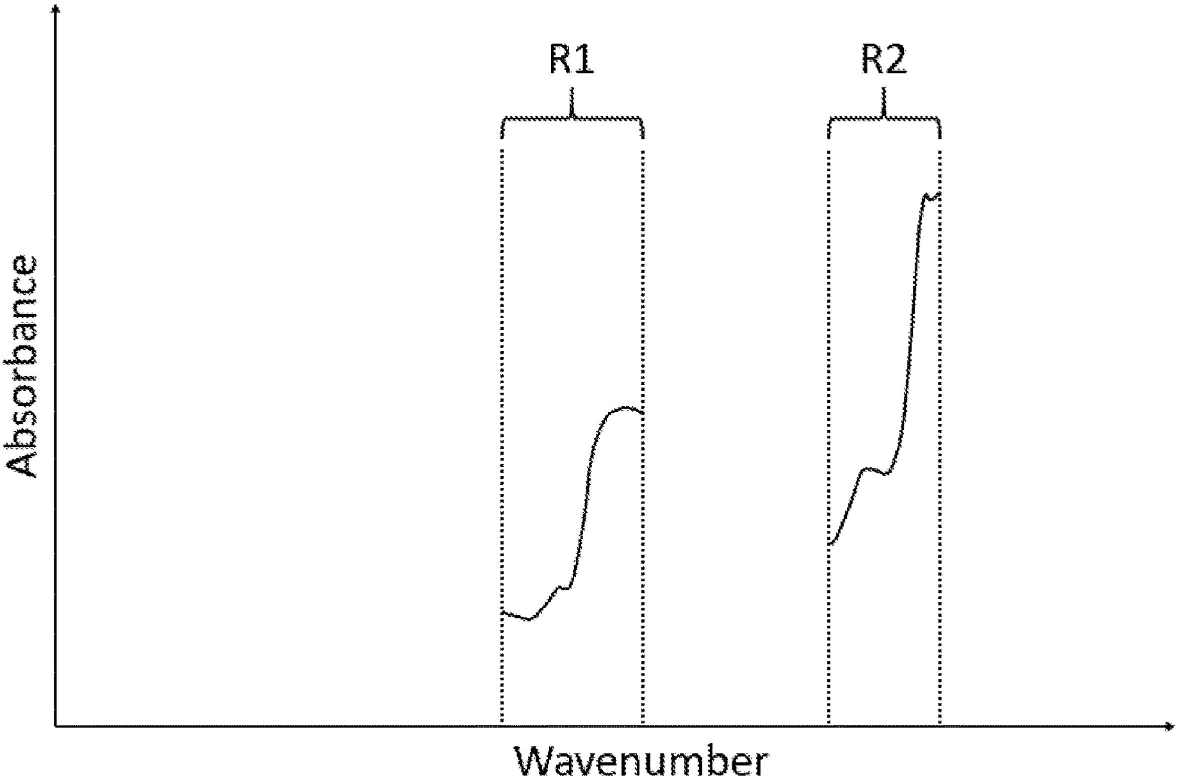
FIG. 4 is a schematic diagram of a near-infrared spectrum for a sample according the present disclosure.

The range of wavenumber/wavelength over which NIR calibration spectra are collected may be selected such that it covers at least a first range and a second range of wavenumber/wavelength. The first range and the second range may be separated ranges (in that they are separated by an intervening range of wavenumber/wavelength). FIG. 3 shows schematically an example NIR spectrum (e.g. a NIR calibration spectrum), showing a first range of wavenumber R1, and a second range of wavenumber R2, where R1 and R2 are separated by an intervening range of wavenumber. It will be appreciated the spectra shown in FIG. 3 is highly schematic and is not intended to represent a spectra for any specific material. The spectra may be collected only over the first and the second range (i.e. the collection of NIR absorption data may be collected only over wavenumber ranges R1 and R2 during NIR spectroscopy step T5 in FIG. 2), or spectra may be collected over a collection range which extends outside the first and second range, and the initial spectra collected over the collection range is then pre-processed during a calibration data pre-processing step T7 in FIG. 2 such that the pre-processed spectra only contains data (e.g. NIR absorbance data) over the first and second range of wavenumber/wavelength. The endpoints of the first and second ranges may be selected according to approaches set out further herein. FIG. 4 shows schematically a NIR calibration spectrum wherein only absorbance data in the ranges R1 and R2 has been included in the spectrum.

Where the NIR calibration spectra comprise first and second ranges of wavelength/wavenumber separated by an intervening range of wavelength/wavenumber, the ranges R1 and R2 of the NIR calibration spectra may be selected based on the substance of interest. So, for example, where the substance of interest comprises nicotine, the range R1 may comprise the range 5000 $cm^{-1}$ to 7000 $cm^{-1}$, 5200 $cm^{-1}$ to 6800 $cm^{-1}$, 5400 $cm^{-1}$ to 6600 $cm^{-1}$, 5600 $cm^{-1}$ to 6400 $cm^{-1}$, 5700 $cm^{-1}$ to 7200 $cm^{-1}$, or 5701 $cm^{-1}$ to 6067 $cm^{-1}$; and the range R2 may comprise the range 7500 $cm^{-1}$ to 9900 $cm^{-1}$, 7700 $cm^{-1}$ to 9700 $cm^{-1}$, 7900 $cm^{-1}$ to 9500 $cm^{-1}$, 8100 $cm^{-1}$ to 9300 $cm^{-1}$, 8200 $cm^{-1}$ to 9200 $cm^{-1}$, or 8274 $cm^{-1}$ to 9192 $cm^{-1}$. In an embodiment, the range R1 comprises the range 5701 $cm^{-1}$ to 6067 $cm^{-1}$ and the range R2 comprises the range 8274 $cm^{-1}$ to 9192 $cm^{-1}$.

Where the substance of interest comprises propylene glycol (PG), the range R1 may comprise the range, 6400 $cm^{-1}$ to 8200 $cm^{-1}$, 6600 $cm^{-1}$ to 8000 $cm^{-1}$, 6800 $cm^{-1}$ to 7800 cm 1, 7000 $cm^{-1}$ to 7600 $cm^{-1}$, 7200 $cm^{-1}$ to 7400 $cm^{-1}$ or 7262 $cm^{-1}$ to 7376 $cm^{-1}$. The range R2 may comprise the range 7600 $cm^{-1}$ to 9300 $cm^{-1}$, 7800 $cm^{-1}$ to 9100 $cm^{-1}$, 8000 $cm^{-1}$ to 8900 $cm^{-1}$, 8200 $cm^{-1}$ to 8700 $cm^{-1}$, 8400 $cm^{-1}$ to 8500 $cm^{-1}$, or 8439 $cm^{-1}$ to 8441 $cm^{-1}$. In an embodiment, the range R1 comprises the range 7262 $cm^{-1}$ to 7376 $cm^{-1}$, and the range R2 comprises the range 8439 $cm^{-1}$ to 8441 $cm^{-1}$.

Where the substance of interest comprises a cannabinoid (e.g. cannabidiol (CBD), cannabidiolic acid (CBDa), tetrahydrocannabinol (THC), tetrahydrocannabinolic acid (THCa), cannabinol (CBN), cannabinolic acid (CBNa), cannabigerol (CBG), cannabigerolic acid (CBGa), cannabichromene (CBC), cannabichromenic acid (CBCa), and/or cannabidiol hydroxyquinone (CBDHQ or HU-331)), or constituents, derivatives, or combinations thereof, the range R1 may comprise the range 4700 $cm^{-1}$ to 7000 $cm^{-1}$, 4900 $cm^{-1}$ to 6800 $cm^{-1}$, 5100 $cm^{-1}$ to 6600 $cm^{-1}$, 5300 $cm^{-1}$ to 6400 $cm^{-1}$, 5500 $cm^{-1}$ to 6200 $cm^{-1}$, or 5681 $cm^{-1}$ to 6002 cm 1. The range R2 may comprise one of a first or second range, where the first range is 3300 $cm^{-1}$ to 5200 $cm^{-1}$, 3500 $cm^{-1}$ to 5000 $cm^{-1}$, 3700 $cm^{-1}$ to 4800 $cm^{-1}$, 3900 $cm^{-1}$ to 4600 $cm^{-1}$, 4100 $cm^{-1}$ to 4400 $cm^{-1}$, or 4328 $cm^{-1}$ to 4330 $cm^{-1}$, and the second range is 7300 $cm^{-1}$ to 9200 $cm^{-1}$, 7500 $cm^{-1}$ to 9000 $cm^{-1}$, 7700 $cm^{-1}$ to 8800 $cm^{-1}$, 7900 $cm^{-1}$ to 8600 $cm^{-1}$, 8100 $cm^{-1}$ to 8400 $cm^{-1}$, 8253 $cm^{-1}$ to 8265 $cm^{-1}$. In an embodiment, the range R1 comprises the range 5681 $cm^{-1}$ to 6002 $cm^{-1}$, and the range R2 comprises the range 8253 $cm^{-1}$ to 8265 cm 1. However, it will be appreciated that more than two ranges may be used, such that, for example, three ranges R1, R2a and R2b are used, wherein R2a is selected from the first set of ranges for R2, and R2b is selected from the second set of ranges for R2.

Where the substance of interest comprises water, the ranges R1 and R2 may be selected from a first, second, third, fourth or fifth range of wavelength/wavenumber, where the ranges R1 and R2 do not overlap, and are separated by an intervening range of wavelength/wavenumber. The first range may comprise the range 4399 $cm^{-1}$ to 4401 $cm^{-1}$, 4200 $cm^{-1}$ to 4600 $cm^{-1}$, 4000 $cm^{-1}$ to 4800 $cm^{-1}$, 3800 $cm^{-1}$ to 5000 $cm^{-1}$, 3600 $cm^{-1}$ to 5200 $cm^{-1}$, or 3400 $cm^{-1}$ to 5400 $cm^{-1}$. The second range may comprise the range 5149 $cm^{-1}$ to 5151 $cm^{-1}$, 4950 $cm^{-1}$ to 5350 $cm^{-1}$, 4750 $cm^{-1}$ to 5550 $cm^{-1}$, 4550 $cm^{-1}$ to 5750 $cm^{-1}$, 4350 $cm^{-1}$ to 5950 $cm^{-1}$, or 4150 $cm^{-1}$ to 6150 $cm^{-1}$. The third range may comprise the range 6939 $cm^{-1}$ to 6941 $cm^{-1}$, 6740 $cm^{-1}$ to 7140 $cm^{-1}$, 6540 $cm^{-1}$ to 7340 $cm^{-1}$, 6340 $cm^{-1}$ to 7540 $cm^{-1}$, 6140 $cm^{-1}$ to 7740 cm 1, or 5940 $cm^{-1}$ to 7940 $cm^{-1}$. The fourth range may comprise the range 8599 $cm^{-1}$ to 8601 $cm^{-1}$, 8400 $cm^{-1}$ to 8800 $cm^{-1}$, 8200 $cm^{-1}$ to 9000 $cm^{-1}$, 8000 $cm^{-1}$ to 9200 $cm^{-1}$, 7800 $cm^{-1}$ to 9400 $cm^{-1}$, or 7600 $cm^{-1}$ to 9600 $cm^{-1}$. The fifth range may comprise the range 10299 $cm^{-1}$ to 10301 $cm^{-1}$, 10100 $cm^{-1}$ to 10500 $cm^{-1}$, 9900 $cm^{-1}$ to 10700 $cm^{-1}$, 9700 $cm^{-1}$ to 10900 $cm^{-1}$, 9500 $cm^{-1}$ to 11100 $cm^{-1}$, or 9300 $cm^{-1}$ to 11300 $cm^{-1}$. In an embodiment, the range R1 comprises the range 4399 $cm^{-1}$ to 4401 $cm^{-1}$, and the range R2 comprises the range 10299 $cm^{-1}$ to 10301 $cm^{-1}$. However, it will be appreciated that more than two ranges may be used, such that, for example, five ranges R1, R2, R3, R4, and R5 are used, wherein each is respectively selected from the first, second, third, fourth, and fifth sets of ranges set out above.

Suitable first and second ranges of wavelength/wavenumber (i.e. R1 and R2) to use for a given substance of interest may be identified by following an approach based on the use of a $2^{nd}$ derivative filter to analyse of one or more NIR spectra for a material containing the substance of interest, and/or by assessing the degree of variability between NIR spectra obtained for material samples comprising different concentrations of the substance of interest. Thus, one or more NIR spectra can be collected over a first range of wavelength/wavenumber (e.g. from 4000 $cm^{-1}$ to 12000 $cm^{-1}$), and the $2^{nd}$ derivative of the one or more NIR spectra analysed over this range using a $2^{nd}$ derivative filter of absorbance to identify sub-ranges in which absorbance peaks are present. Horizon MB software (ABB) may be used to compute and visualise the $2^{nd}$ derivative of the NIR spectra. The first and second ranges of wavelength (i.e. R1 and R2) may be selected so as to match two of these sub-ranges (i.e. by selecting two sub-ranges whose endpoints are set at wavelength/wavenumber values with particularly high magnitudes of the $2^{nd}$ derivative of absorbance), or by iteratively using different ones of a plurality of sub-ranges associated with a particularly high magnitudes of the $2^{nd}$ derivative of absorbance as the respective ranges R1 and R2, and determining via experimentation which of the two sub-ranges provide the most accurate determination of an amount of the substance of interest in a sample of material (e.g. using a validation approach as set out further herein).

In another approach for determining suitable first and second ranges of wavelength/wavenumber (i.e. R1 and R2), the variance in a plurality of NIR spectra obtained from a plurality of calibration samples with differing amounts of the substance of interest is determined with respect to wavelength/wavenumber (e.g. over a range from 4000 $cm^{-1}$ to 12000 $cm^{-1}$). This can be computed, for example, using proprietary tools in the Horizon MB software (ABB), but more generally, any mathematical approach known to the skilled person for quantifying variance between absorbance profiles with respect to wavelength/wavenumber across a plurality of NIR spectra can be used. First and second ranges of wavelength/wavenumber (i.e. R1 and R2) may be selected to match sub-ranges over which the variance is particularly high (i.e. by selecting two sub-ranges with the greatest magnitude of variance from among a plurality of sub-ranges defined as the ranges of wavelength/wavenumber over which the variance of absorbance is higher than a predefined threshold value), or by iteratively using different ones of sub-ranges of particularly high variance for R1 and R2, and determining via experimentation which two sub-ranges provide the most accurate determination of an amount of the substance of interest in a sample of material (e.g. using a validation approach as set out further herein). Where a predefined threshold value of absorbance is used to find sub-ranges, the value may be iteratively changed and the number of sub-ranges with absorbance above the threshold determined for each iteration. A threshold may be used which provides two or more separated ranges, with the two ranges with the highest integral of variance being used as R1 and R2.

As part of an optional NIR calibration spectra pre-processing step T7, the calibration spectra may be pre-processed using, for example, baseline correction, mean-centering, normalization, orthogonal signal correction, multiplicative scatter correction, Savitsky-Golay derivatisation, 1st derivative filtering, $2^{nd}$ derivative filtering, or any other approach known to the skilled person. Principal Component Analysis may be used to determine what, if any, pre-processing steps to apply to the data, according to techniques known to the skilled person. Pre-processing will generally be carried out with the aim of removing variation which is not a factor of the analytical information comprised in the calibration spectra.

Following steps T1 to T7, there has been established for each calibration sample of the set of calibration samples (i) ground truth quantity information about the amount of at least one substance of interest in the calibration sample, and (ii) one or more NIR calibration spectra for the calibration sample (noting there may be multiple NIR calibration spectra obtained for each calibration sample, which may be averaged to obtain an averaged NIR calibration spectrum). As described further herein, the NIR calibration spectra may be collected over two separated wavelength/wavenumber ranges R1 and R2, or pre-processed to window NIR calibration spectra collected over a continuous range into NIR calibration spectra comprising two separated wavelength/wavenumber ranges R1 and R2.

In a chemometric model establishment step T8, a chemometric model is established/derived/trained on the basis of calibration data comprising the set of NIR calibration spectra obtained in steps T5 to T7, and the ground-truth quantity information associated with the calibration spectra, obtained in steps T2 to T4. Such a model may be established according to any suitable approach known to the skilled person, and may comprise, for example, a Partial Least Squares (PLS) model, a multivariate curve resolution (MCR) model, or neural network model. The skilled person may apply any suitable chemometric model derivation approach in which a model can be trained and/or calibrated based on (i) one or more NIR calibration spectra (or information derived from NIR spectra by, for example, a process of logical abstraction/dimensional reduction), and (ii) ground truth quantity information associated with each respective one of the calibration spectra.

In some embodiments, the chemometric model comprises a neural network or other machine learning approach. Where a neural network approach or other machine learning approach is used, it may be configured to be implemented on a general purpose computer. The neural network approach may be configured to run on a CPU or a GPU. The skilled person will recognise that the machine learning approach may be configured to run within any suitable machine learning framework known in the art, such as TensorFlow, Torch or Caffe. Alternatively the approach may be programmed by the using a suitable programming language, for example, Python, MatLab or C++.

Where the chemometric model is a neural network model, a configuration of operators, functions, weights, biases, and other parameters relating to the operation of the neural network may be selected. For example, in one embodiment the neural network comprises an artificial neural network, and the configuration of the approach may comprise selecting a number of layers, selecting a number of nodes per layer, selecting and configuring activation functions, selecting and configuring weighting coefficients (or 'weights') selecting and configuring biasing coefficients (or 'biases'), selecting and configuring convolution operators, selecting and configuring pooling operators, selecting and configuring sub-sampling operators, selecting and configuring rectifying operators, selecting and configuring one or more classification layers. Suitable operators and parameters values may be selected by the skilled person, for example, based on experimentation or modelling.

The configuration of the neural network is carried out such that the output of the neural network (e.g. the value(s) at an output layer of the neural network) comprise information about the quantity of one or more substances of interest. For example, the output may comprise a vector of length n, where each of the n values is a quantity of a different substance of interest. The configuration of the neural network is carried out such that the input of the neural network (e.g. the value(s) at an input layer of the neural network) comprises NIR spectrum information (e.g. one or more NIR calibration spectra associated with a one or more calibration samples, as derived in steps T5 to T7). Thus the input may comprise an n by m matrix representing NIR absorbance over wavenumber/wavelength ranges R1 and R2. The input may comprise a plurality of NIR calibration spectra.

Once the neural network is configured, a training stage is applied, which may be iterated over a plurality of times in order to train the neural network approach to carry out the objective task of estimating the amount of a substance of interest in a sample of analyte based on one or more NIR spectra derived from the analyte, to a desired level of performance. In some embodiments, the objective of the training task is to minimize (reduce to a desired threshold) the error between the ground-truth quantity information associated with a calibration or validation sample, and the output generated by applying the neural network approach to the input NIR calibration or validation spectrum/spectra associated with the same sample. The error may be minimized with respect to a plurality of training stages applied to a single input NIR spectrum, or a plurality of training stages applied to a plurality of input NIR spectra.

Thus in the training stage, a training NIR spectrum is selected from a set of calibration spectra acquired in the calibration spectra collection step, and applied as an input to the neural network approach. The input may comprise NIR absorbance information over two separated ranges of wavelength/wavenumber, R1 and R2, as described further herein. For example, in one embodiment the neural network approach is a convolutional neural network (CNN), and the calibration NIR spectrum is supplied as an input to the input layer of the CNN. An output is then generated by applying the neural network approach to the input NIR spectrum. This provides an output, for example, in terms of a vector representing estimated quantities for each of n substances of interest in the calibration sample associated with the NIR spectrum applied as the input.

In a comparison step, the output is compared ground-truth quantity information associated with the calibration sample from which the NIR spectrum was derived. This may be in the form of a vector representing quantities for each of n substances of interest in the calibration sample, determined, for instance, by a complementary analytical method as described further herein (e.g. in steps T2 to T4). The objective of this comparison is to determine how closely the output of the neural network approach matches the ground-truth quantity information. In one embodiment, this comparison is used to determine an instance of error information, which is information quantifying the magnitude/degree of difference between the output and the label information. This comparison may be achieved in any manner known to the skilled person, for example, through use of an appropriate error function such as a cross-correlation function.

In a neural network updating stage, the error information is used to modify the operation of the neural network approach. For example, the neural network approach may comprise a plurality of operators and a plurality of parameters, and these may be adjusted based on the error information. A gradient descent or other backpropagation approach known to the skilled person may be used to update weight values associated with the hidden layers of the neural network on the basis of the error information.

As the skilled person will appreciate, what is significant about the training stage is not a particular training method or algorithm, but that the method chosen for training is able to modify some characteristic of the neural network approach/algorithm in order to enable the algorithm to generate an output for a given input NIR spectrum (e.g. a calibration spectrum) which more closely approximates the ground-truth quantity information associated with the sample from which the input NIR spectrum was derived (i.e. reduces a measure of error between the output and the ground-truth quantity information).

Thus where the chemometric model establishment step T8 comprises establishment of a neural network, the result of the chemometric model establishment step T8 is a chemometric model at step T9 which has been trained using calibration data established in steps T1 to ST, and is ready to be applied to NIR spectra derived from one or more analyte samples in order to estimate a quantity of one or more substances of interest in each analyte sample.

In other embodiments of the approach, the chemometric model established at step T8 comprises a Partial Least Squares model. As the skilled person is aware, PLS modelling is a statistical approach in which principal components are extracted from data, wherein the principal components describe the sources of variation within the data. The principal components are correlated with information such as the concentrations of substances of interest in samples from which the data is derived (e.g. ground-truth quantity information as established in steps T2 to ST), in order to derive a set of latent variables. The PLS approach is generally applied by using what is referred to as X-block and Y-block information. In the present context of NIR spectroscopy, the X-block information comprises spectral data (e.g. NIR calibration spectra as obtained in steps T5 to T7), and the Y-block information comprises one or more target variables which are to be estimated/predicted (for example, ground truth quantity information as derived at steps T2 to T4).

In a first stage of the chemometric model establishment at step T8, a calibration model is established. This stage may be referred to as a model derivation stage or model training stage. The inputs used to establish the calibration model comprise at least X-block information and Y-block information as described above. The X-block data (e.g. NIR calibration spectra information) may comprise information about NIR absorbance over a first range of wavenumber/wavelength R1, and a second range of wavenumber/wavelength R2, where R1 and R2 are separated by an intervening range of wavenumber (as shown schematically in FIGS. 3 and 4). As described above in relation to steps T5 to T7, where the NIR calibration spectra comprise information about NIR absorbance over separated ranges of wavenumber/wavelength, this may be achieved by acquiring NIR spectra only over ranges R1 and R2 during NIR spectroscopy step T5, and/or by pre-processing NIR calibration spectra in pre-processing step T7 (e.g. by windowing the spectra to remove information in ranges of wavenumber/wavelength outside of R1 and R2).

Once the calibration model is established, a PLS prediction model is established in step T8, using the calibration model. The PLS prediction model generally comprises a measurement sub-model and a structural sub-model, wherein the measurement sub-model represents relationships between the calibration data comprised in the calibration model and a set of latent variables, and the structural sub-model represents the relationships between the latent variables. An iterative algorithm is used to solve the PLS model by estimating latent variable values by using the measurement and structural model in alternating steps. This can follow any approach for PLS model establishment/solution known to the skilled person. The number of factors to be used can be optimised by plotting the number of factors used in the model against the difference between the predicted and actual values of the quantity of the substance of interest for a range of values of the number of factors, then assessing a calibration curve to identify regions of particularly low gradient, which correspond to envelopes of more accurate performance. A number of factors to be used in the PLS model may then be selected from a region of low gradient on the plot, preferably where the value of the difference between the predicted and actual values of the quantity of the substance of interest tends close to zero. Without wishing to be bound by any particular theory, it is thought that selecting too low a number of factors detrimentally affects model accuracy, and too high a number of factors leads to a more rigid model which is less able to provide accurate quantification for samples differing from compositions comprised in the calibration sample set. Thus selecting a suitable number of factors is a compromise between these two extremes. The PLS prediction model can be implemented in any suitable environment known to the skilled person, for example, MatLab, PLS_Toolbox, or Horizon MB. A calibration curve is generated as an output of establishing the PLS model, which can be used to assess the performance of the model and determine if model parameters need to be changed, and/or whether the calibration data requires augmenting with additional NIR spectra for additional samples.

The performance of the model may be determined using standard approaches known to the skilled person for quantifying, for example, the fit of the model to the calibration data, quantifying the error in calibration of the model, and quantifying the error in the prediction of the model. The standard measures of R2, standard error of calibration (RMSEC) and standard error of prediction (RMSEP), may be used to quantify the performance of the model. Quantification of the performance of the model may be carried out by using validation associated with a set of validation samples, which are prepared/selected in the manner described further herein for preparing/selecting the set of calibration samples in steps T1 to T4, wherein the validation data comprise ground truth quantity information for the validation samples, and NIR validation spectra derived for the validation samples using the NIR spectroscopy approach applied to the calibration samples in steps T5 to T7. In some embodiments, the validation samples comprise a subset of the calibration samples prepared/selected at step T1, and the validation data comprises NIR calibration spectra and ground truth quantity information associated with the subset of calibration samples. In some embodiments, the validation samples are different to the calibration samples.

To quantify the performance of the chemometric model, the model is run using the NIR validation spectra as inputs, and the values of R2, standard error of calibration (RMSEC) and standard error of prediction (RMSEP) are determined based on, for example, computing residuals in the fitted model, and/or comparing the output of the model to the ground truth quantity information for the validation data. These validation steps may, for example, be performed as an internal validation within suitable analysis software such as Horizon MB Depending on the performance of the chemometric model, as quantified via, for example, $R^2$, standard error of calibration (RMSEC) and standard error of prediction (RMSEP), the set of calibration samples may be increased and/or a different set of calibration samples used, and the model re-established. The performance of the model may again be quantified via a further validation procedure as described further herein, for example, using validation data associated with one or more validation samples. An external validation may also be performed by comparing the quantity of a substance of interest in a sample as estimated by the chemometric model on the basis of NIR spectroscopy data, with a quantity of the substance of interest in the same sample as determined via a complementary spectroscopic technique (for example, gas or liquid chromatography). Parameters such as $R^2$, standard error of calibration (RMSEC) and standard error of prediction (RMSEP) may be derived using data about the quantity of the substance of interest derived using the complementary spectroscopic technique as an input. If the variance between the quantities estimated by the chemometric model and the complementary spectroscopic technique respectively is outside an acceptable limit, the set of calibration samples may be increased and/or a different set of calibration samples used, and the model re-established. This comparison of amounts of the substance of interest determined by the chemometric model on the basis of NIR spectroscopy data, and by a complementary spectroscopic technique such as gas or liquid chromatography, may be referred to as an external or cross-check validation. In some embodiments, where the variance between the amount of the substance of interest determined by the chemometric model and determined via the complementary spectroscopic technique respectively is particularly high for a given sample (e.g. outside a predefined threshold of accuracy), NIR spectroscopy data for the given sample may be added to the calibration data, and the chemometric model re-established according to step T8.

Thus where the chemometric model establishment step T8 comprises establishment of a PLS model, the result of the chemometric model establishment step T8 is a chemometric model at step T9 which has been trained using calibration data established in steps T1 to T7, and is ready to be applied to NIR spectra derived from one or more analyte samples in order to estimate a quantity of one or more substances of interest in each analyte sample.

Figure 5:
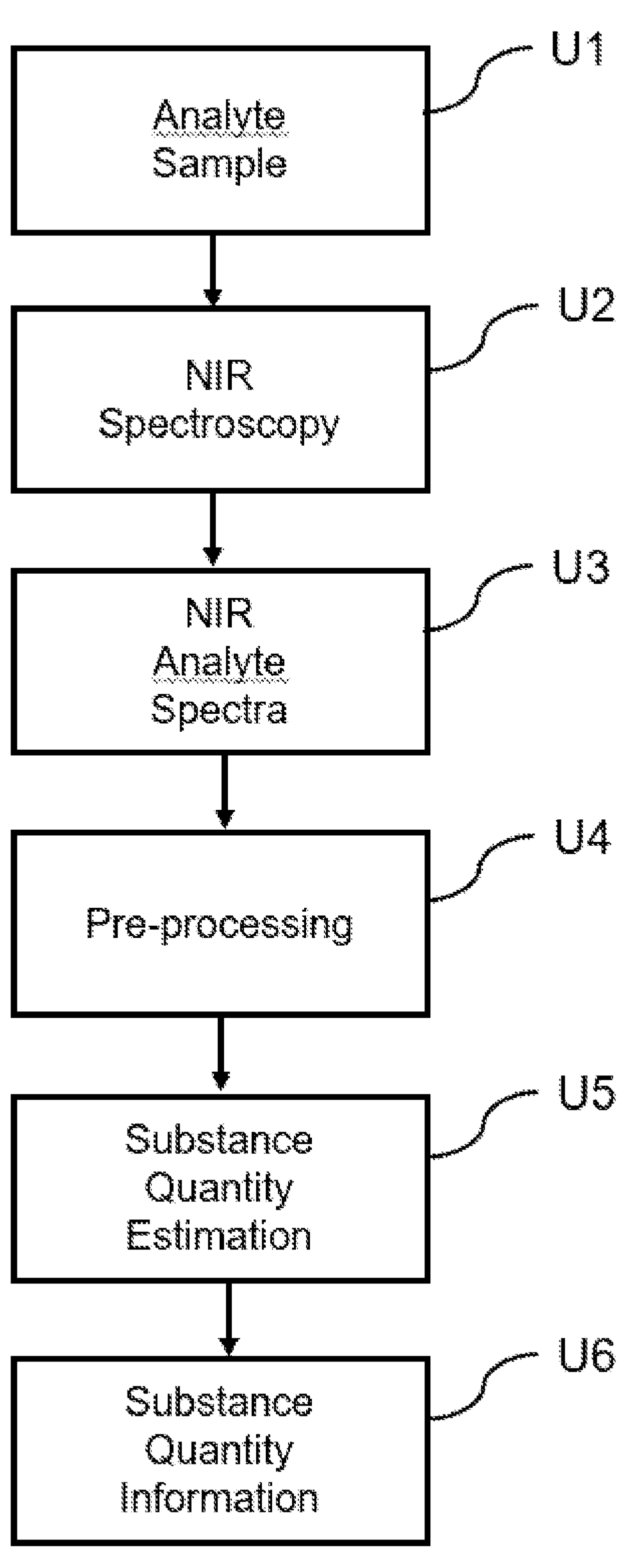
FIG. 5 is a schematic diagram of an approach for estimating an amount of a substance in a sample using a chemometric model.

FIG. 5 schematically shows an approach to the estimation of a quantity of one or more substances of interest in a sample of a material for use in a delivery system. Such a sample may be referred to herein as an 'analyte' sample. In an analyte sample preparation step U1, an analyte sample is prepared/selected. The analyte may comprise any material for use in a delivery system (e.g. a tobacco-industry delivery system), as described further herein, or a substance for use in such a material. In some embodiments, the analyte sample comprises a sample of material for use in a delivery system wherein the material contains an active substance such as nicotine or a cannabinoid. In some embodiments, the material is a liquid material for use in an aerosol delivery device.

In an NIR spectroscopy step U2, one or more NIR analyte spectra are obtained for the analyte sample, using NIR spectroscopy approaches described further herein. The range of wavenumber/wavelength over which spectra are collected may be selected such that it covers at least a first range and a second range. The first range and the second range may be separated ranges (in that they are separated by an intervening range of wavenumber/wavelength). FIGS. 3 and 4 show schematically an example NIR spectrum, showing a first range of wavenumber R1, and a second range of wavenumber R2, where R1 and R2 are separated by an intervening range of wavenumber. The spectra may be collected only over the first and the second range (i.e. the collection of NIR absorption data may be collected only over wavenumber ranges R1 and R2 during NIR spectroscopy step U2), or spectra may be collected over a collection range which extends outside the first and second range, and the initial spectra collected over the collection range is then pre-processed during a NIR analyte spectra pre-processing step U4 such that the pre-processed spectra only contains data (e.g. NIR absorbance data) over the first and second range of wavenumber/wavelength. The endpoints of the first and second ranges may be selected according to approaches set out further herein.

The ranges R1 and R2 used for the NIR analyte spectra may be selected based on the substance of interest. So, for example, where the substance of interest comprises nicotine, the range R1 may comprise the range 5000 $cm^{-1}$ to 7000 $cm^{-1}$, 5200 $cm^{-1}$ to 6800 $cm^{-1}$, 5400 $cm^{-1}$ to 6600 $cm^{-1}$, 5600 $cm^{-1}$ to 6400 $cm^{-1}$, 5700 $cm^{-1}$ to 7200 $cm^{-1}$, or 5701 $cm^{-1}$ to 6067 cm 1; and the range R2 may comprise the range 7500 $cm^{-1}$ to 9900 $cm^{-1}$, 7700 $cm^{-1}$ to 9700 cm 7900 $cm^{-1}$ to 9500 $cm^{-1}$, 8100 $cm^{-1}$ to 9300 $cm^{-1}$, 8200 $cm^{-1}$ to 9200 $cm^{-1}$, or 8274 $cm^{-1}$ to 9192 $cm^{-1}$. In an embodiment, the range R1 comprises the range 5701 $cm^{-1}$ to 6067 $cm^{-1}$ and the range R2 comprises the range 8274 $cm^{-1}$ to 9192 $cm^{-1}$. Exemplary ranges R1 and R2 for other substances of interest (e.g. cannabinoids, water, and propylene glycol) are set out above). It will be appreciated, as set out above, that more than two ranges may be used, provided the ranges are separated by an intervening range of wavenumber. Thus where herein two ranges R1 and R2 are referred to, this may be generalised by the skilled person to any number of non-overlapping ranges, separated by an intervening range of wavelength/wavenumber.

It will be appreciated that suitable separated ranges (R1 and R2) of wavelength/wavenumber may be used for either or both of the NIR calibration spectra used to establish the chemometric model, and the NIR analyte spectra input the chemometric model to estimate the quantity of a substance of interest in an analyte from which the NIR analyte spectra is/are derived. Thus in some embodiments one or more NIR calibration spectra comprise separated ranges (R1 and R2) of wavelength/wavenumber (where data in the intervening range is not used in establishing the model), and one or more NIR analyte spectra comprise one or more different ranges of wavelength/wavenumber (e.g. a continuous range comprising R1 and R2 and the intervening range, and optionally extending above and below the outer extents of ranges R1 and R2). In other embodiments one or more NIR analyte spectra comprise separated ranges (R1 and R2) of wavelength/wavenumber (where data in the intervening range is not used in establishing the model), and one or more NIR calibration spectra comprise one or more different ranges of wavelength/wavenumber (e.g. a continuous range comprising R1 and R2 and the intervening range, and optionally extending above and below the outer extents of ranges R1 and R2). In some embodiments the ranges R1 and R2 selected for the analyte sample are the same as ranges R1 and R2 selected for the NIR calibration spectra used to establish the chemometric model. The use of separated ranges allows accuracy of the model to be maintained with lower overheads in terms of data acquisition and/or processing, by preferentially using parts of the NIR analyte/calibration spectra which are particularly significant for identifying a particular substance or substances of interest.

As part of optional calibration spectra pre-processing step U4, the NIR analyte spectra obtained at step U3 may be pre-processed using, for example, baseline correction, mean-centering, normalization, orthogonal signal correction, multiplicative scatter correction, Savitsky-Golay derivatisation, 1st derivative filtering, $2^{nd}$ derivative filtering, or any other approach known to the skilled person.

In a substance quantity estimation step U5, the NIR analyte spectra information (optionally pre-processed in step U4) is input to the chemometric model established in the earlier chemometric model establishment step (see step T8 in FIG. 2) to generate an estimate of an amount of a substance of interest in the analyte sample on the basis of the NIR analyte spectra information. The information output may be referred to as substance quantity information, and describes the amount of one or more substances of interest in the analyte sample (e.g. a sample of material, such as an aerosol generating liquid material, for use in a delivery system), in terms of, for example, weight percent (w/w %), volume percent (v/v %), weight by volume (w/v %), mole fraction, or parts per million (ppm). The chemometric model (e.g. a neural network model or PLS model as described further herein) may be configured to be implemented on a general purpose computer as described further herein (e.g. configured to run on a CPU or a GPU), and may be implemented in any suitable environment known to the skilled person (for example, MatLab, PLS_Toolbox, or Horizon MB, Python, MatLab, C++, TensorFlow, Torch or Caffe).

The following sets out a non-limiting example of an application of the approach set out herein for the estimation of a quantity of nicotine in a sample of analyte using NIR spectroscopy data and a PLS chemometric mode.

Example 1

In an example of the approach described herein, amounts of substances of interest comprising nicotine, polyethylene glycol (PG), vegetable glycerine (VG) and water were estimated in samples of liquid analyte using NIR spectroscopy and a chemometric model established using partial least squares (PLS) modelling.

A total of 221 calibration samples were prepared, comprising a range of concentrations of each of the substances of interest. The calibration samples were selected such that the range of concentrations for each substance of interest was distributed across the desired working range of the chemometric model for estimation of quantity of the substance of interest in samples of analyte. The working ranges were 20% w/w to 70% w/w for each of PG and VG, 0% w/w to 25% w/w for water, and 0% w/w to 6% w/w for nicotine. Accordingly, the calibration samples comprised samples with concentrations of nicotine ranging from 2% w/w to 6% w/w, samples with concentrations of PG and VG ranging from 20% w/w to 70% w/w, and samples with concentrations of water ranging from 0% w/w to 25% w/w. The calibration sample set included samples with different concentrations of different flavouring compounds and acids in order to seek to eliminate bias in the quantification of the substances of interest as a result of the presence of flavouring compounds and acids.

Calibration spectra were obtained for each of the 221 calibration samples using NIR spectroscopy. The NIR calibration spectra were obtained over a wavenumber range from at least 5701 to 9192 $cm^{-1}$. Spectra were collected using an NIR MB3600 NIR spectrometer (ABB) with Horizon MB software (ABB) used to collect and analyse spectra, establish the chemometric model, and perform validation analysis. Spectra were collected from liquid calibration samples, loaded into a standard liquid sample holder. Spectra were collected at an ambient temperature of 30° C., with 64 scans being collected, at a gain of 27.14, and a resolution of 8. The 64 spectra for each sample were averaged prior to being used to establish the PLS model. Ground truth quantity information for each of the calibration samples was derived using flame ionisation detection gas chromatography (GC-FID) as a complementary analytical method.

A PLS model was established according to the PLS approach set out further herein using pre-processed calibration spectra for each calibration sample, wherein each calibration spectra were pre-processed to obtain data over a first wavenumber range (R1) from 5701 to 6067 $cm^{-1}$ and a second wavenumber range (R2) from 8274 to 9192 $cm^{-1}$. Data in the intervening range from 6067 to 8274 $cm^{-1}$ was not used in establishing the PLS model. The NIR calibration spectra were further pre-processed using $2^{nd}$ derivative filtering prior to being used to derive the PLS model.

The performance of the model was assessed by using NIR validation spectra obtained using NIR spectroscopy for a set of 47 validation samples, comprising concentrations of nicotine ranging from 2% w/w to 6% w/w, concentrations of PG and VG ranging from 20% w/w to 70% w/w, and concentrations of water ranging from 0% w/w to 25% w/w, with additions of different flavours and acids. The NIR validation spectra were obtained over a wavenumber range from at least 5701 to 9192 $cm^{-1}$. The NIR validation spectra were pre-processed to obtain data over a first wavenumber range (R1) from 5701 to 6067 $cm^{-1}$ and a second wavenumber range (R2) from 8274 to 9192 $cm^{-1}$, with data in the intervening range from 6067 to 8274 $cm^{-1}$ being discarded. The data were further pre-processed using $2^{nd}$ derivative filtering prior to being input into the PLS model. The PLS model used 9 factors.

The pre-processed NIR validation spectra were input to the PLS model, and the performance of the model quantified using the standard measures of R2, standard error of calibration (RMSEC) and standard error of prediction (RMSEP). The PLS model had an R2 of 0.995, an RMSEC of 0.1, and an RMSEP of 0.09. This compares to an 8-factor PLS model established using NIR calibration spectra for 122 calibration samples, and validated with 14 validation samples, wherein the NIR calibration spectra covered a single wavenumber range of 8424 to 9215 $cm^{-1}$, and for which the performance of the model was quantified as having an R2 value of 0.952, the RMSEC was 0.225 and the RMSEP was 0.12.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

The invention claimed is:

1. A method of quantifying an amount of a substance in a sample of material for a delivery system, the method comprising:

obtaining first near infra-red spectroscopy data for the sample of material in a first wavelength range;

obtaining second near infra-red spectroscopy data for the sample of material in a second wavelength range, wherein the second wavelength range is separated from the first wavelength range; and using the first and second near infra-red spectroscopy data to estimate an amount of the substance in the sample of material;

wherein the first wavelength range covers the range from 5700 to 6100 cm-1; and wherein the second wavelength range covers the range from 8200 to 9200 cm-1.

2. The method of claim 1, wherein the material comprises a liquid for a delivery system.

3. The method of claim 1, wherein the material comprises a solid for a delivery system.

4. The method of claim 1, wherein the material comprises a gel for a delivery system.

5. The method of claim 1, wherein the material comprises a material for an aerosol delivery system.

6. The method of claim 1, wherein the material comprises a material for use in an oral delivery system selected from a list comprising snus, snuff, gums, gels, spray, and patches.

7. The method claim 1, wherein the substance comprises an active substance.

8. The method of claim 7, wherein the substance comprises nicotine.

9. The method of claim 7, wherein the substance comprises a cannabinoid.

10. The method claim 1, wherein the substance comprises vegetable glycerine.

11. The method of claim 1, wherein the substance comprises propylene glycol.

12. The method of claim 1, wherein the substance comprises water.

13. The method of claim 1, wherein the amount of the substance in the sample of liquid is estimated using a chemometric model.

14. The method of claim 13, wherein the chemometric model is derived using a partial least squares approach.

15. The method of claim 13, wherein the chemometric model is derived using a neural network approach.

16. The method of claim 13, wherein the chemometric model is derived based on spectroscopy data for a plurality of calibration samples of liquid, wherein the plurality of samples of liquid have different known amounts of the substance.

17. The method of claim 13, wherein the amount of the substance in the sample of liquid is quantified by providing, as an input to the chemometric model, the first near infra-red spectroscopy data for the sample of liquid in the first wavelength range, and the second near infra-red spectroscopy data for the sample of liquid in the second wavelength range, and wherein the output of the chemometric model comprises an estimate of an amount of the substance in the sample of liquid.

18. A method of obtaining calibration data to use for quantifying an amount of a substance in a sample of material for a delivery system, the method comprising:

obtaining first near infra-red spectroscopy data for a calibration sample of material containing a first known amount of the substance in a first wavelength range;

obtaining second near infra-red spectroscopy data for the calibration sample of material in a second wavelength range; and combining the first near infra-red spectroscopy data and the second near infra-red spectroscopy data to provide the calibration data;

wherein the first wavelength range covers the range from 5700 to 6100 cm-1; and wherein the second wavelength range covers the range from 8200 to 9200 cm-1.

19. The method of claim 18, further comprising:

obtaining further first near infra-red spectroscopy data for a further calibration sample of material containing a further known amount of the substance in a first wavelength range;

obtaining further second near infra-red spectroscopy data for the further calibration sample of material in a second wavelength range; and combining the further first near infra-red spectroscopy data and the further second near infra-red spectroscopy data with the calibration data.

20. A non-transitory computer program product for quantifying an amount of substance in a sample of material for a delivery system, the computer program product comprising instructions which, when the program is executed by a computer, cause the computer to carry out the steps of:

obtaining first near infra-red spectroscopy data for the sample of material in a first wavelength range;

obtaining second near infra-red spectroscopy data for the sample of material in a second wavelength range, wherein the second wavelength range is separated from the first wavelength range; and using the first and second near infra-red spectroscopy data to estimate an amount of the substance in the sample of material;

wherein the first wavelength range covers the range from 5700 to 6100 $cm^{-1}$; and wherein the second wavelength range covers the range from 8200 to 9200 $cm^{-1}$.

21. A non-transitory computer program product for obtaining calibration data to use for quantifying an amount of a substance in a sample of material for a delivery system, the computer program product comprising instructions which, when the program is executed by a computer, cause the computer to carry out the steps of:

obtaining first near infra-red spectroscopy data for the sample of material in a first wavelength range;

obtaining second near infra-red spectroscopy data for the sample of material in a second wavelength range, wherein the second wavelength range is separated from the first wavelength range; and using the first and second near infra-red spectroscopy data to estimate an amount of the substance in the sample of material;

wherein the first wavelength range covers the range from 5700 to 6100 $cm^{-1}$; and wherein the second wavelength range covers the range from 8200 to 9200 $cm^{-1}$.

* * * * *